United States Patent [19]

Nakano

[11] Patent Number: 5,092,440
[45] Date of Patent: Mar. 3, 1992

[54] SLIPPING CLUTCH

[75] Inventor: Isamu Nakano, Hirakata, Japan

[73] Assignee: Tsubakimoto Emerson Co., Osaka, Japan

[21] Appl. No.: 575,916

[22] Filed: Aug. 31, 1990

[30] Foreign Application Priority Data

May 30, 1990 [JP] Japan ................... 2-138595

[51] Int. Cl.⁵ .................... F16D 7/02; F16D 43/21
[52] U.S. Cl. ........................ 192/56 R; 192/70.14;
192/107 M; 464/47
[58] Field of Search ............ 192/56 R, 70.14, 107 M;
464/45, 46, 47, 48

[56] References Cited

U.S. PATENT DOCUMENTS

| | | | |
|---|---|---|---|
| 3,105,371 | 10/1963 | Forrest | 464/46 |
| 3,203,268 | 8/1965 | Manoni et al. | 464/46 X |
| 3,207,000 | 9/1965 | White | 192/107 M X |
| 3,487,658 | 1/1970 | Johnson | 464/46 |
| 3,654,777 | 4/1972 | Grundman | 192/107 M X |
| 3,681,940 | 8/1972 | Albrile | 192/46 X |
| 3,842,620 | 10/1974 | Scozzafava | 464/47 X |
| 4,325,474 | 4/1982 | Rae | 464/47 X |

Primary Examiner—Richard Lorence
Attorney, Agent, or Firm—Flynn, Thiel, Boutell & Tanis

[57] ABSTRACT

A slipping clutch having opposed driving and driven members, and a friction plate disposed therebetween such that a slipping torque may be obtained between the driving and driven members. The friction plate is made of fiber of high strength, and the member which slips relative to the friction plate is made of engineering plastics. In a preferred embodiment, a friction plate of high strength fiber is frictionally engaged on axially opposite sides of the driven member, which member is made of engineering plastics.

5 Claims, 2 Drawing Sheets

SLIPPING CLUTCH

FIELD OF THE INVENTION

The present invention relates to a so-called "slipping clutch" which is used in torque transmission mechanisms having a rotational speed difference such that a transmitting torque, namely, a slipping torque, may be obtained by causing slippage at all times between the driving and driven members. In particular, the present invention relates to a slipping clutch suitable for transmitting a relatively small slipping torque in various office automation equipment.

BACKGROUND OF THE INVENTION

Conventionally, slipping clutches are in use as brakes for rolls in paper feeding mechanisms in copying machines, typewriters, etc., or as steady brakes in spindle portions in textile machinery, or as steady brakes in winding machines in photo film developers, plastic film formers, etc. As shown in FIG. 5, such a slipping clutch 40 comprises a hub 41, a pusher plate 43 connected to the hub 41 by means of a key 42, a friction plate 44 made of high strength fiber secured to the plate 43, and a metallic driven plate 45 adapted to transmit torque in cooperation with the friction plate 44. A spring 46 and a nut 47 generate an urging force to cause frictional contact of the friction plate 44 and the driven plate 45. A sliding bearing 48 rotatably supports the driven plate 45 and receives thrust force. When a torque is transmitted from the pusher plate 43 on the driving side to the driven plate 45, the driven plate 45 is adapted to cause slippage so as to transmit a torque while slipping. The value of the torque at the time when the slippage is taking place is generally called "slipping" torque.

However, as use is continued, metallic and fibrous worn particles are generated on the slipping surfaces of the driven plate 45 and the friction plate 44, which tends to cause fluctuation of the slipping torque. Furthermore, since there must be a clearance between the plate 43 and the hub 40 so as to allow the axial movement of the plate 43 relative to the hub 40, the clearance tends to cause misalignment of the plate 43 and driven plate 45 due to manufacturing tolerances, vibration, etc. Thus, it has been difficult to obtain a relatively small and stable slipping torque.

SUMMARY OF THE INVENTION

The present invention provides, in a slipping clutch, a pair of driving and driven opposing members, and a friction plate disposed therebetween such that a slipping torque may be obtained between the driving and driven members. The friction plate is made of fiber of high strength, and the member which slips relative to the friction plate is made of engineering plastics.

In a preferred embodiment of the invention, one of the opposing members is a hub having a flanged part and the other is a driven plate made of engineering plastics and having a cylindrical portion and a disk portion. The friction plate made of fiber of high strength is disposed between said flanged part and the disk portion. A composite friction plate which is rotation-constrained relative to the hub is urged toward the disk portion. The composite friction plate comprises a resilient plate and friction material of fiber having high strength bonded to the surface of the resilient plate.

Since the materials of the opposing members between which a frictional force is applied are engineering plastics and fiber of high strength, respectively, the amount of worn particles due to friction may be substantially reduced, thereby minimizing fluctuation of the slipping torque. Even if there are a few worn particles, the mesh structure of the friction plate may absorb such particles, and thus, the slipping surfaces are not damaged. The slipping member may be made by, for example, injection molding, thereby eliminating the necessity of ordinary cutting or grinding work, which contributes to reduced manufacturing costs.

In the slipping clutch of the present invention, even if the driven plate becomes misaligned due to a momental load, etc., the composite friction plate is capable of deforming following the misalignment of the driven plate owing to its resiliency, thereby reducing fluctuation of the slipping torque. This also eliminates the necessity of manufacturing the associated parts with high degree of accuracy.

DETAILED DESCRIPTION

Figure 1:
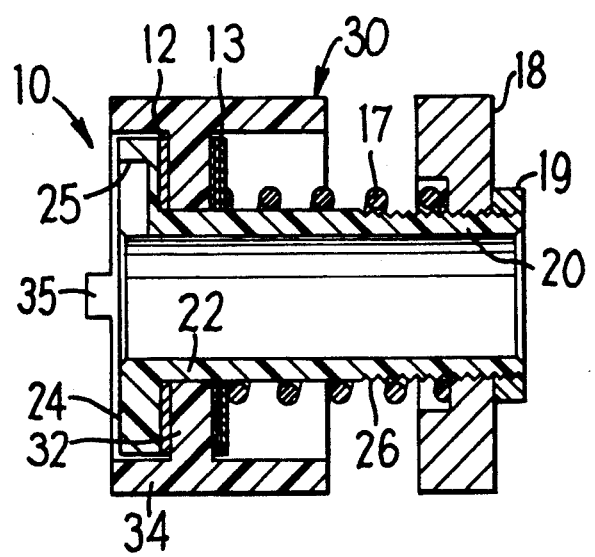
FIG. 1 is an axial section of a slipping clutch according to the present invention.

In FIG. 1 showing an axial section of a slipping clutch according to the present invention, the slipping clutch 10 comprises a driving hub 20, a driven plate 30, a pair of friction plates 12, 13, a spring 17 and an adjusting nut 18 for adjusting the urging force imparted to the friction plates 12, 13. The hub 20 and the driven plate 30 constitute a pair of driving and driven opposing members connected to driving and driven members (not shown), respectively. A collar 19 prevents the nut 18 from falling off.

Figure 2:
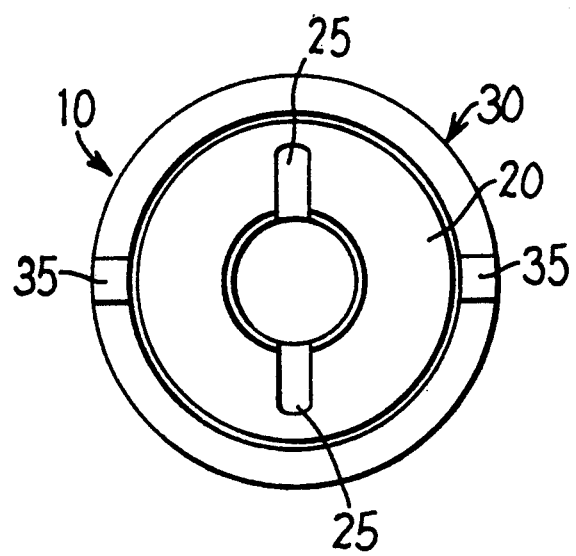
FIG. 2 is a left side view of FIG. 1.

The hub 20 includes a cylindrical sleeve part 22 for receiving an end of a driving shaft (not shown), a surrounding flange 24 formed at one end, and a threaded part 26 formed at the other end. As shown in FIG. 2, a pair of radially projecting grooves 25, 25 are formed in the flange 24 for receiving pins of a driving shaft (not shown) so as to nonrotatably connect the hub 20 with the driving shaft. The threaded part 26 threadedly receives the adjusting nut 18. The hub 20 is made of engineering plastics, such as, PPO (Polyphenylene oxide), PPS (Polyphenylene sulfide), POM (Polyacetal) etc.

On the other hand, the driven plate 30 comprises a disk portion 32 which surrounds the sleeve part 22 and is joined to a surrounding cylindrical wall portion 34. The disk portion 32 has a concentric opening of inner diameter which is slightly greater than the outer diameter of the cylindrical part 22 so as to provide a relatively rotatable clearance-fit therebetween. A pair of axial protrusions 35, 35 are formed at one end of the disk portion 34 and are spaced apart at 180 degrees. The protrusions 35, 35 are adapted to engage with a driven member (not shown) so as to transmit torque therebetween. The driven plate 30 is also made of engineering plastics. Said engineering plastic materials are usually possessed of a so-called "self-lubricating" property; however, it is preferable that a sliding member (i.e. member 20 and/or member 30) be positively impregnated with a lubricating material or oil. Owing to the above-mentioned structure, the driven plate 30 may be rotatably supported on the hub 20; and thus a separate bearing is not needed.

The friction plate 12 is sandwiched between the flange 24 and the disk portion 32 and is simply disk-shaped and is made of fiber of high strength, which is typically aramid fiber. Preferably, the friction plate 12 is formed as a solidified sheet using aramid fiber impregnated with Teflon resin. Alternatively, the plate 12 may be formed as a sheet using steel fiber, glass fiber, carbon fiber, boron fiber, etc. as base material impregnated with or immersed in synthetic resin, such as polytetrafluoroethylene (Teflon) or polychlorotrifluoroethylene.

Figure 3:
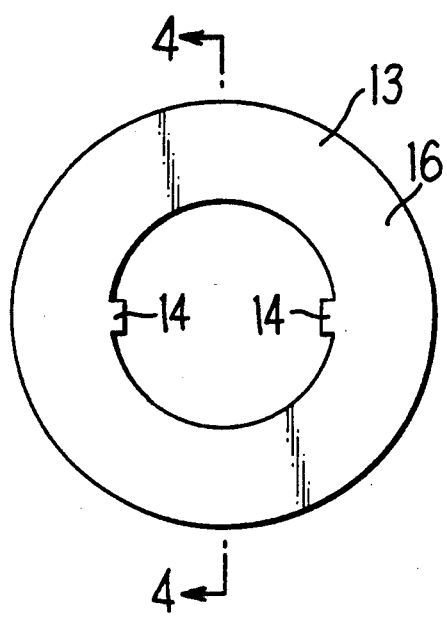
FIG. 3 is a front view of a friction member.
Figure 4:
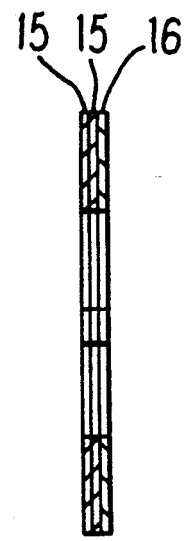
FIG. 4 is a section along line 4—4 of FIG. 3.
Figure 5:
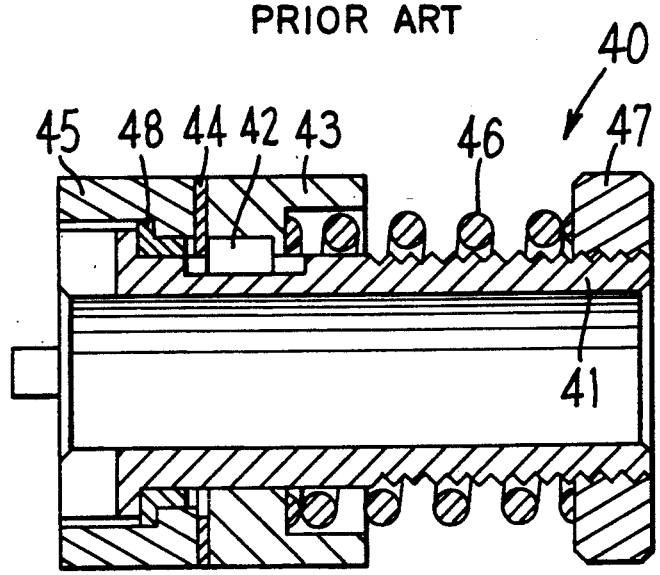
FIG. 5 is an axial section of a conventional slipping clutch.

The other friction plate, namely, the composite friction plate 13 disposed between the driven plate 30 and the spring 17 is, as shown in FIGS. 3 and 4, shaped like a disk having a pair of radially-inward protrusions 14, 14 on the inner circumference thereof and spaced apart at 180 degrees. These protrusions 14, 14 are adapted to fit into spline grooves (not shown) formed in the exterior of the hub 20. Thus, the composite friction plate 13 may be prevented from rotating relative to the hub 20 while being freely movable in the axial direction.

The composite friction plate 13 comprises two layers 15, 15 of friction material backed by a resilient plate 16. The layer of the friction material may be only one depending upon the strength of the fiber material. The friction material may be the same as the one used in the aforesaid friction plate 12. The thickness thereof is relatively small as to allow the deformation of the friction material itself. The plate 16 is made of resilient material. For example, it may be made of metallic material, plastics or rubber; and is also made relatively thin so as to allow its deformation. Advantageously, it may be made of stainless steel as used for springs.

Owing to the frictional contact between the engineering plastic having a self-lubricating property and fiber of high strength, occurrence of worn particles may be substantially suppressed and useful life may be prolonged.

Furthermore, owing to the above-mentioned structure, the driven plate 30 will hardly be twisted or misaligned relative to the hub 20. Even if there occurs such a misalignment, the composite friction plate 13 may follow the movement of the driven plate 30, since the composite friction plate 13 is capable of axially moving freely relative to the driven plate 30 and the hub 20; and is capable of being deformed to a certain extent. Consequently, the fluctuation of the slipping torque may be suppressed.

Moreover, since there are two slipping surfaces at the opposite sides of the disk portion 32, more stable slipping torque may be obtained.

Since the friction plates 12, 13 are made of high strength fiber, the mesh structure of its fiber texture may absorb worn particles, if any, which may be generated due to friction. Thus, the amount of worn particles which may be sandwiched between the friction plates 12, 13 and the driven plate 30 can substantially be reduced, thereby reducing the likelihood of damaging the slipping surfaces.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A slip clutch, comprising:
  a rotatable first member, said first member comprising an axially extending hub portion having a flange integral therewith and extending radially outwardly therefrom;
  a rotatable second member made of an engineering plastic material having a self-lubricating property, said second member being rotatable with respect to said first member, said second member comprising an internal disk portion disposed adjacent to and axially opposed to said flange and an outer axially extending cylindrical wall portion surrounding said disk portion, one of said first and second members being adapted to be rotated by an input element and the other of said first and second members being adapted to rotate an output element;
  a first friction plate made of high strength fibers, said first friction plate being disposed between said flange and said disk portion and providing clutch faces engagable with said flange and said disk portion;
  a second friction plate disposed on said hub portion on the opposite side of said disk portion from said first friction plate, said second friction plate being connected to said hub portion for rotation therewith and for axial sliding movement with respect thereto toward said disk portion, said second friction plate comprising a resilient, deformable base member remote from said disk portion and friction layer means made of fibers of high strength, said friction layer means being bonded to the surface of said resilient deformable plate and facing said opposite side of said disk portion and providing a clutch face engageable with said opposite side of said disk portion; and
  means for resiliently biasing said second friction plate toward said disk portion.

2. A slip clutch, comprising:
  a rotatable driving member adapted to be rotated by an input element, said driving member comprising an axially extending hub portion having an annular flange integral therewith and extending radially outwardly therefrom at one axial end thereof;
  a rotatable driven member mad of an engineering plastic material having a self-lubricating property, said driven member being coaxial with and being rotatable with respect to said driving member and being adapted to rotate an output element, said driven member comprising an internal, radially inwardly extending annular disk portion disposed adjacent to and axially opposed to said flange, said disk portion closely surrounding and being rotatable with respect to said hub portion, and an outer, axially extending, cylindrical wall portion surrounding and secured to said disk portion and also surrounding and radially outwardly spaced from said flange;
  a first, thin, annular, friction disk made of high strength fibers, said first friction plate surrounding said hub and being disposed axially between said flange and said disk portion and providing clutch faces engagable with said flange and said disk portion;
  a second, thin annular friction disk surrounding said hub portion and disposed on the opposite side of said disk portion from said first friction plate, said second friction plate being connected to said hub portion for rotation therewith and for axial sliding movement with respect thereto toward said disk portion, said second friction plate comprising a thin, resilient, deformable base member remote from said disk portion and friction layer means made of fibers of high strength, said friction layer means being bonded to the surface of said resilient deformable plate and facing said opposite side of said disk portion and providing a clutch face engageable with said opposite side of said disk portion; and a coil spring encircling said hub portion and engaging said second friction disk for resiliently urging said second friction plate into frictional engagement with said disk portion.

3. A slip clutch as claimed in claim 2 wherein said flange of said driving member has an axially facing, first surface remote from said disk portion, said surface having radially projecting groove means therein which are engagable by the input element in order to connect said hub portion to the input element for conjoint rotation, and said driven member has an axially facing, second surface facing int he same axial direction as said first surface and having driving means in said second surface which are engagable by the output element in order to connect said cylindrical wall portion to the output element for conjoint rotation.

4. A slip clutch as claimed in claim 2 in which said first friction disk is free of direct driving connection to said hub portion and to said flange.

5. A clutch according to claim 2, wherein said annular disk portion has an opening therethrough through which projects said hub portion for defining a minimal clearance fit therebetween for permitting relative rotation between said hub portion and said annular disk portion, and each of said driving and driven members being constructed of engineering plastics with the engineering plastics defining one of said members being lubricant impregnated.

* * * * *

UNITED STATES PATENT AND TRADEMARK OFFICE
CERTIFICATE OF CORRECTION

PATENT NO. : 5 092 440
DATED : March 3, 1992
INVENTOR(S) : Isamu Nakano

It is certified that error appears in the above-identified patent and that said Letters Patent is hereby corrected as shown below:

Column 4, line 63; after "hub" insert ---portion---.

Signed and Sealed this

Twenty-fourth Day of August, 1993

Attest:

BRUCE LEHMAN

Attesting Officer      Commissioner of Patents and Trademarks